United States Patent
Perry

[15] 3,663,192
[45] May 16, 1972

[54] GLASS MELTING POT

[72] Inventor: Walter Merton Perry, Darien, Conn.

[73] Assignee: Johns-Manville Corporation, New York, N.Y.

[22] Filed: Nov. 28, 1969

[21] Appl. No.: 880,713

[52] U.S. Cl. ................................65/11 R, 65/335, 65/347, 65/356
[51] Int. Cl. ............................................C03b 37/02
[58] Field of Search..............65/11 W, 11 R, 1, 347, 335, 65/356

[56] References Cited

UNITED STATES PATENTS

| | | | |
|---|---|---|---|
| 2,949,633 | 8/1960 | Drummond et al. | 65/11 X |
| 2,992,517 | 7/1961 | Hicks, Jr. | 65/11 X |
| 3,209,641 | 10/1965 | Upton | 65/335 X |
| 3,244,496 | 4/1966 | Apple et al. | 65/347 X |

Primary Examiner—Arthur D. Kellogg
Attorney—John A. McKinney and Robert M. Krone

[57] ABSTRACT

A circular bushing or glass melting pot assembly of the type which has a multiplicity of apertures in the bottom of the pot to permit the drawing of a multiplicity of continuous glass filaments therefrom. The main body of the pot is made of a high melting point base metal such as nickel, a nickel base alloy, a nickel-chromium base alloy, a cobalt-nickel base alloy, stainless steel or the like, and the pot is preferably heated by one or more spiral electric heating coils disposed around the outside surface of the sidewalls and spaced therefrom. A secondary heating coil may be mounted in the lower central portion of the pot, with a conical metal shell disposed over the secondary heating coil both to enclose the coil and to prevent the accumulation of a stagnant section of somewhat cooler glass in the lower central portion of the pot. A cylindrical body is preferably positioned in the center of the pot, starting at the top, to confine the melting zone to an outer annular space, and uniform feeding of marbles to this space is provided. For higher production rates, the upper melting zone of the pot is larger in diameter to increase the rate of melting.

12 Claims, 6 Drawing Figures

INVENTOR.
WALTER MERTON PERRY,
BY John A. McKinney
ATTORNEY

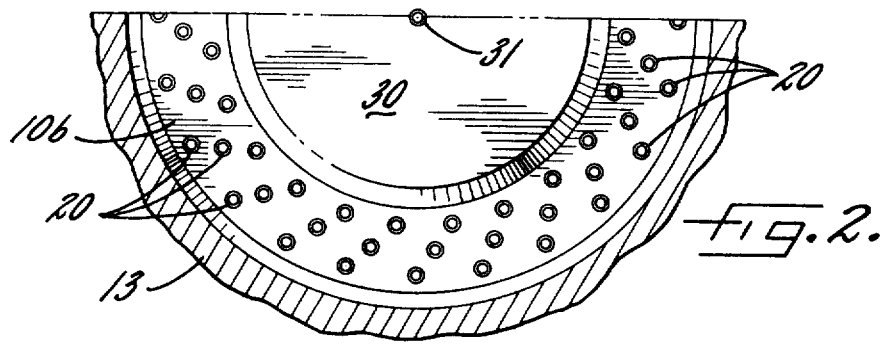
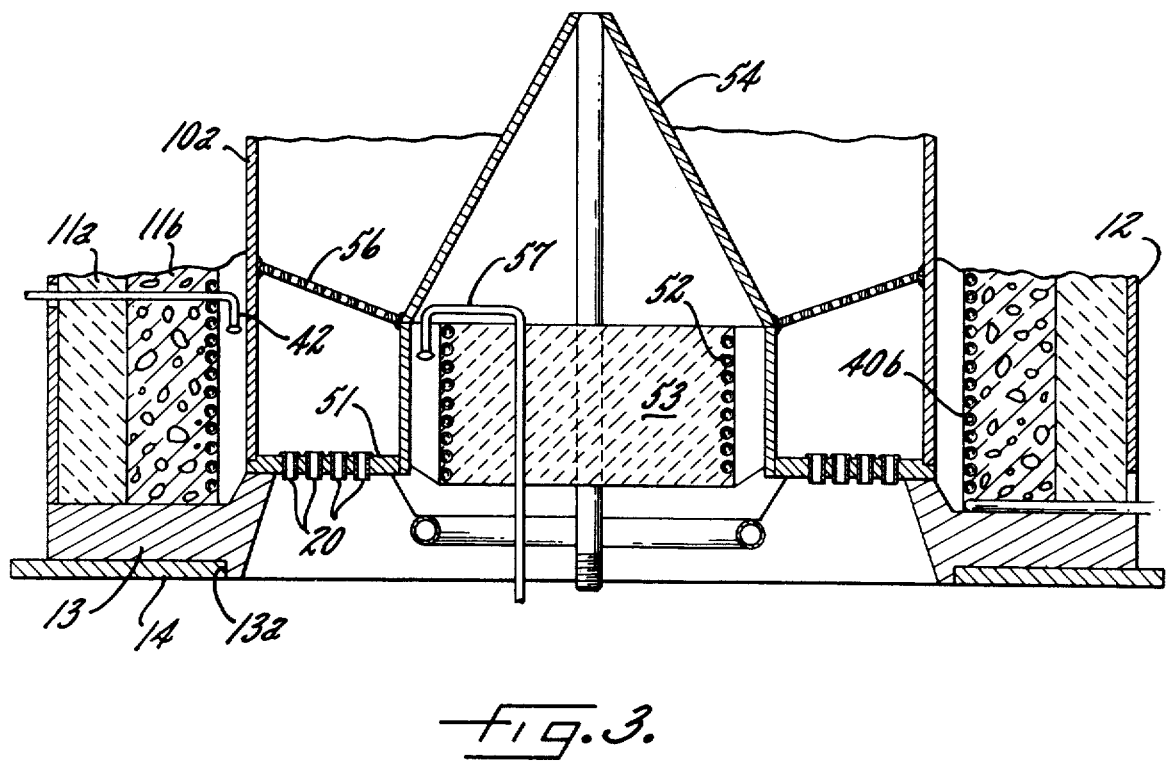

INVENTOR.
WALTER MERTON PERRY

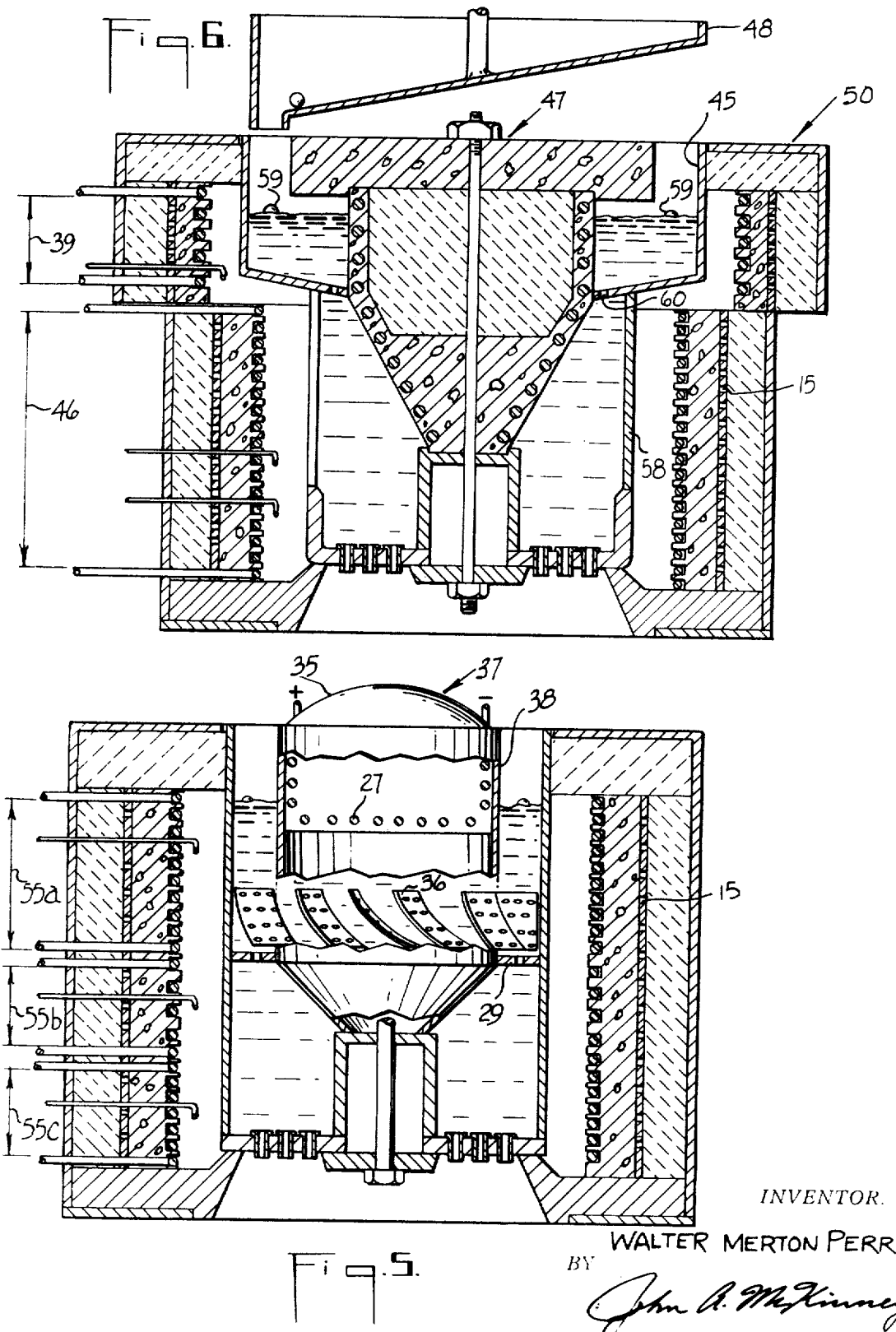

GLASS MELTING POT

BACKGROUND OF THE INVENTION

The present invention relates generally to the art of the glass fiber formation, and more particularly to an improved circular bushing or glass melting pot assembly of the type which has a multiplicity of apertures in the bottom of the pot to permit the drawing of a multiplicity of continuous glass fibers or filaments therefrom. The invention has application to both the formation of continuous strands for use as rovings and textile fibers and also the formation of primary filaments for conversion into fine fibers by the flame attenuation process for use primarily as insulations.

BRIEF SUMMARY OF THE INVENTION

It is a primary object of the present invention to provide an improved glass melting pot assembly of the type used for the simultaneous drawing of a multiplicity of continuous glass filaments which is capable of producing the filaments from a relatively high melting point glass, such as E glass.

It is a further object of the invention to provide a glass melting pot assembly, which is capable of producing the filaments from relatively soft glasses, having low melting points. A related object of the invention is to provide such an improved glass melting pot which substantially reduces the breaking of the filaments when made from a relatively soft glass.

It is another object of the invention to provide an improved melting pot assembly of the foregoing type which heats the molten glass in the pot uniformly around the entire circumference of the pot. In this connection, a related object of the invention is to provide such an improved melting pot assembly which produces uniformly sized filaments.

A further object of the invention is to provide an improved glass melting pot assembly of the type described above which is capable of maintaining a selected temperature within close limits and with a high degree of uniformity.

Still another object of the invention is to provide such an improved glass melting pot assembly which is relatively inexpensive even when made in relatively large sizes to accommodate a large number of filaments, and one which can be efficiently operated from a power consumption standpoint.

Yet another object of the invention is to provide such an improved melting pot which provides more uniform and controllable temperature throughout the body of molten glass contained therein, thereby improving the uniformity and quality of the glass filaments drawn therefrom.

Another object of the invention is to insure a fast rate of melting of the glass so it passes rapidly through the liquidus temperature to prevent devitrification. A related object is to reduce the total quantity of glass in the pot and confine the glass to the region where its temperature can be most uniformly controlled and to provide glass feeding means to insure uniform distribution of the cold glass to the pot.

Still another object of the invention is to apply the heat in such a way that there is a relatively high liquid head of glass of uniform temperature and viscosity in order to permit using relatively small orifices which give more uniform filaments.

Another object is to provide simple means for imparting a rotational motion to the direction of flow of the glass in the pot to provide mixing and greater temperature uniformity.

Still another object of the invention is to provide a glass pot assembly that can be used in connection with a direct melt process, the glass flowing to the pot already melted, and the features of the pot assembly serving to insure uniform filaments.

BRIEF DESCRIPTION OF THE DRAWINGS

Other objects and advantages of the invention will become apparent from the following detailed description and upon references to the accompanying drawings, in which:

FIG. 2 is a bottom view taken along line 2—2 in FIG. 1;

FIG. 3 is a sectional elevation of the bottom portion of a modified glass melting apparatus embodying the invention;

FIG. 5 is a sectional elevation of the electrical heating element showing an alternative construction; and FIG. 6 shows a glass melting pot with an enlarged upper section or melting zone which permits a substantially larger application of power and, thereby, reduces the melting time.

DESCRIPTION OF THE PREFERRED EMBODIMENTS

While the invention will be described in connection with certain preferred embodiments, it will be understood that it is not intended to limit the invention to these particular embodiments. On the contrary, it is intended to cover all alternatives, modifications, and equivalent arrangements as may be included within the spirit and scope of the invention.

Figure 1:
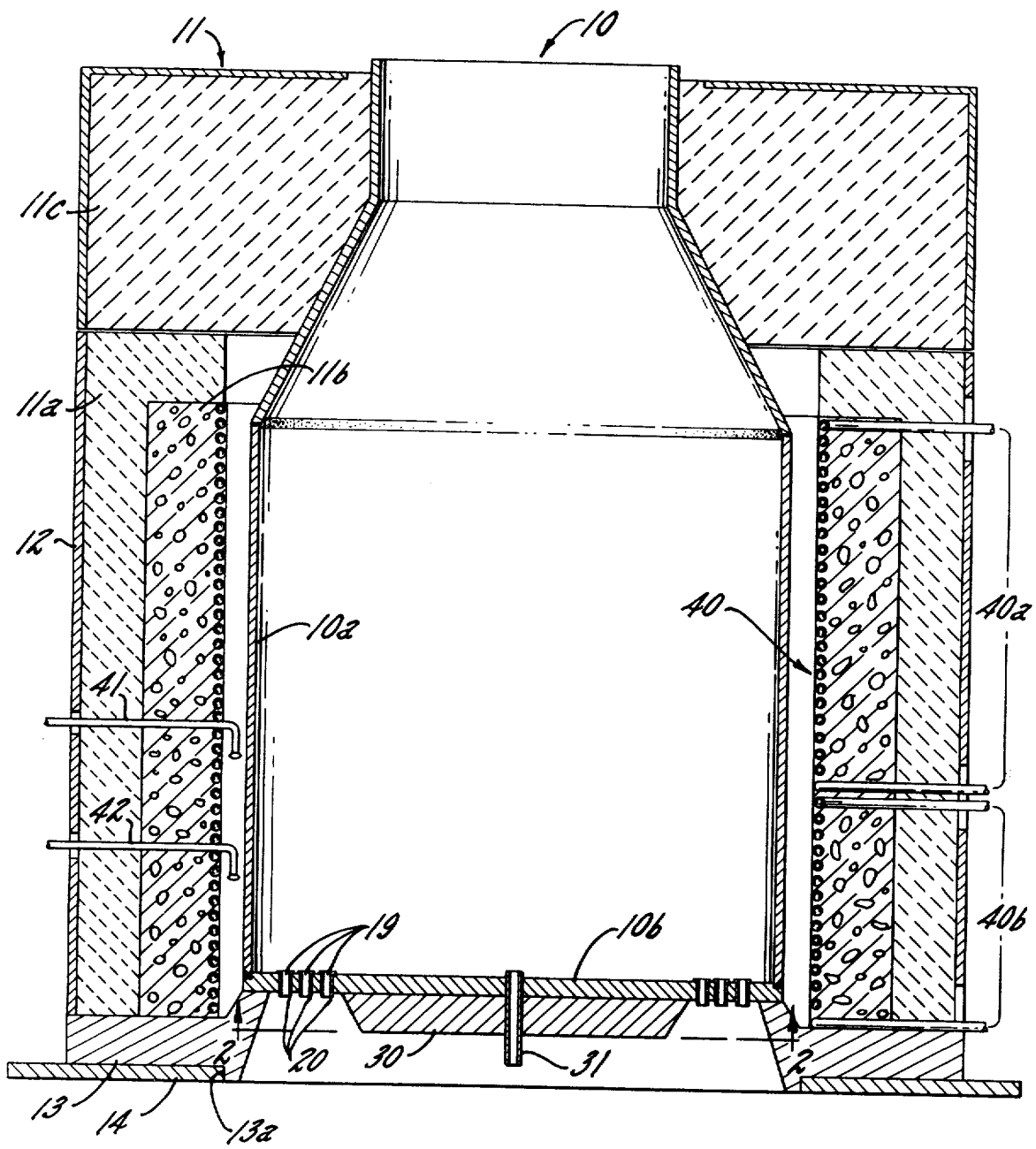
FIG. 1 is a sectional elevation view of a glass melting apparatus including a glass melting pot embodying the present invention.

Turning now to drawing FIG. 1, a melting pot 10, having a cylindrical sidewall 10a and a flat bottom wall 10b, is illustrated in an environmental apparatus for use in producing continuous glass fibers or filaments. The sidewall 10a extends vertically upwardly from the bottom wall 10b and then tapers inwardly to form a vertical necked down inlet throat at the top of the pot through which glass marbles or other glass material can be admitted to the melting chamber inside the pot 10. The environmental apparatus includes a cylindrical refractory casing 11 which is illustrated as being composed of three insulating sections 11a, 11b, and 11c contained within a metallic outer shell 12. The refractory casing 11, which is dimensioned to provide an annular heating space or chamber around the outer surface of the pot 10, is supported on a refractory bottom ring 13. To support the pot 10 within the environmental apparatus, the bottom ring 13 extends inwardly under the bottom wall of the pot around the outer periphery thereof, and an integral depending flange 13a fits downwardly along the inner edge of an annular metal mounting plate 14 so as to automatically center the bottom ring 13 and the pot 10 supported thereon relative to the other components. At the top of the assembly, the refractory section 11c extends inwardly around the throat or neck portion of the pot 10.

For the purpose of forming a multiplicity of continuous glass filaments from the body of molten glass contained within the pot 10, the bottom wall 10b forms a multiplicity of apertures 19 which are arranged in three circles, as illustrated in FIG. 2, extending around the bottom wall near the outer periphery thereof. In the illustrative arrangement, the apertures 19 are lined with sleeves 20, suitably made of a noble metal such as platinum or palladium, which are fitted within the apertures 19. The sleeves 20 are flared at their upper ends to retain them within the bottom wall 10b, and the lower ends thereof extend below the underside of the bottom wall so that the molten glass issuing therefrom does not contact the metal of the bottom wall. The head pressure of molten glass within the pot forces molten glass downwardly through the annular array of apertures, and the resulting filaments are continuously drawn downwardly and attenuated by conventional drawing rolls or a winding mandrel and worked according to any desired procedure. Because of the temperature gradient between the heated sidewalls of the pot 10 and the central portion thereof, the apertures in the inner circles are typically made slightly larger than those in the outer circles so that the filaments drawn from all three circles are of substantially uniform size.

In accordance with the present invention, the glass melting pot is made of nickel or a high melting point base metal alloy, and a spiral electric heating coil is disposed around the outside of the sidewalls of the pot and spaced therefrom for heating the pot primarily by radiation. Thus in the illustrative embodiment, the refractory casing 11 is designed so that the inner surface thereof is spaced away from the vertical sidewalls 10a of the pot so as to form an annular air space between the refractory casing and the outside surface of the sidewalls, and a spiral electric heating coil is wound in grooves in the inner surface of the refractory casing section 11b. In the illustrative arrangement, the heating coil 40 is in two sections 40a and 40b to provide two zone heating in the longitudinal direction if desired. The lower coil section 40b is preferably made relatively short in the longitudinal direction so that more current can be supplied to the lower portion of the pot due to radiation from the bottom wall of the pot. The coils 40a and 40b are preferably made of a high temperature alloy such as "KANTHAL A-1" which is stable at temperatures up to 2,500°F and has an approximate composition of 22 Cr, 5.5 Al, 0.5 Co, balance Fe. "NICHROME V," "TOPHET 30," or similar high temperature heating wire may also be used. The refractory section 11b in which the heating coil is wound preferably has a relatively high density, on the order of 70 to 200 pounds per cubic foot, whereas the outer casing section 11a is a lower density refractory material having superior insulating properties.

For the purpose of controlling the temperatures of the two electric heating coil sections 40a and 40b, two thermocouples 41 and 42 are located in the space between the two coil sections 40a and 40b and the pot wall 10a. The thermocouples 41 and 42, in turn, are connected to the power supply to the coil sections 40a and 40b, respectively, so that the power input is interrupted or reduced in response to predetermined temperatures sensed by the thermocouples. The thermocouple 41 for the upper coil 40a is located at the point of maximum temperature of the glass and the pot sidewalls 10a since this is the point at which the wire in the coil section 40a is likely to fail first in the event that the coil is subjected to excessive temperatures. These thermocouples are extremely important in certain applications of the illustrated assembly; for example, "KANTHAL A-1" heating wire has a melting point of about 2,750°F, and is typically operated at a temperature of about 2,400°F when a glass such as E glass is being melted, so the thermocouples are important to prevent the operating temperature of the coils from rising to the melting point of the coil material.

In keeping the invention, the glass melting pot 10 is made of nickel or a high melting point base metal alloy selected from the group consisting of nickel base alloys, nickel-chromium base alloys, cobalt-nickel base alloys, and stainless steel. Preferred materials are nickel, "INCONEL 600" and the "NICHROME" or "TOPHET" alloys, all of which have melting points of about 2,550°F and can be used up to temperatures of about 2,350°F. Pure nickel is particularly preferred because of its relatively high heat conductivity which assists in lateral heat transfer around the circumference of the pot 10 and into the bottom of the pot.

In accordance with a further important aspect of the invention, adjacent windings of the spiral electric heating coil are spaced from one another by about 0.06 inch to about 0.17 inch. The resistance element may be a wire or ribbon. A typical size is No. 6 wire, and the heating density should be from about 30 to 50 watts per square inch for this application. Heating density is defined and calculated by dividing the watts input to a 12-inch length of a given resistance wire by the surface area of the 12-inch length of wire. This concentrated heating coil is an important feature of the invention because the heat conductivities of the materials used to form the metal pot 10 are relatively low in comparison with noble metals, for examples, and thus it is relatively difficult to obtain uniform heating of the pot sidewalls 10a.

In accordance with still another aspect of the present invention, a secondary electric heating coil is disposed within the central portion of the melting pot at the bottom thereof, and a conical metal shell is disposed over and around the secondary heating coil. Thus in the modified embodiment of FIG. 3, an inner electric heating coil 52 is spirally wound around the outer surface of a refractory core 53 mounted within an opening formed in the central portion of the bottom wall 51. Both the core 53 and the coil 52 extend upwardly from the bottom wall 51 and are surrounded by a conical metal shell 54 which is joined to the inner periphery of the annular bottom wall 51.

In operation, the heating coil 52 heats the base of the conical shell 54 and thus the inner portion of the bottom wall 51, and the heat is also transferred from the shell 54 and the bottom wall 51 to the adjacent glass within the pot. Of course, the upper part of the cone 54 is also heated by radiation from the sidewalls 10a.

To limit the temperature of the coil 52 to a predetermined maximum, a thermocouple 57 is disposed within the space between the base portion of the shell 54 and the coil 52 and is connected to a suitable temperature controller which serves to modulate the power input to the coil 52.

When the melting pots of the type illustrated are used to form filaments from relatively soft glasses, such as the lime-borosilicate glass mentioned previously, the temperature at the center of the pot is typically about 100°F below the temperature at the outer walls (without the illustrative secondary heating coil). This temperature differential results in a generally conical section of relatively cool glass in the lower central portion of the pot, and this relatively cool glass tends to remain stagnant and eventually results in devitrification due to the glass remaining too long at or near the liquidus temperature. As can be seen in FIG. 3, the conical shell 54 serves to displace the molten glass from the space normally occupied by the stagnant cooler glass. By avoiding the stagnant section of cooler glass, the conical shell 54 also avoids the temperature cycling that may be encountered at the bottom of a pot containing such a stagnant section of glass, due to the tendency of the cooler inner core of glass to tip to one side or the other. In the arrangement of FIG. 3, a metal basket 56, of the type normally provided in glass melting pots to prevent partially melted material from approaching the apertures in the bottom wall, interconnects the pot sidewalls and the conical shell 54 to assist in support of the conical shell and the inner heating arrangement within the pot.

As can be seen from the foregoing detailed description, the improved glass melting pot assembly provided by this invention heats the molten glass contained in the pot uniformly around the entire circumference of the pot and produces uniformly sized primary filaments. Since the temperature is maintained within close limits, the apparatus of this invention can be used to produce filaments from relatively soft glasses having a drawing temperature range of from 1,750° to 1,850°F, such as lime-borosilicate glass. The capability of producing filaments from low melting point glasses is a significant advantage not only because of the lower cost of such glasses, but also because such glasses have superior characteristics for certain applications. Furthermore, the furnace and other equipment required to produce marbles of the softer glasses are generally less costly to manufacture and operate, thereby providing further economic advantages. Furthermore, the melting pot assembly provided by this invention can be made in relatively large sizes and operated at a higher degree of efficiency.

A number of modifications in the design of the melting pot assembly have been found desirable in order to insure the greatest possible uniformity in the glass filaments and at the same time to increase the output of the unit. These are illustrated in the drawings, and referring to FIG. 4 we show the pot housing 11 which refractory insulating elements 11a, 11b, and 11c contained in metal casing 12. The higher density refractory 11b, which is made with spiral grooves to hold the heating wires in position, may be cast within a stainless steel perforated cylinder 15 to prevent cracking or breaking of the refractory from expansion and contraction.

Figure 4:
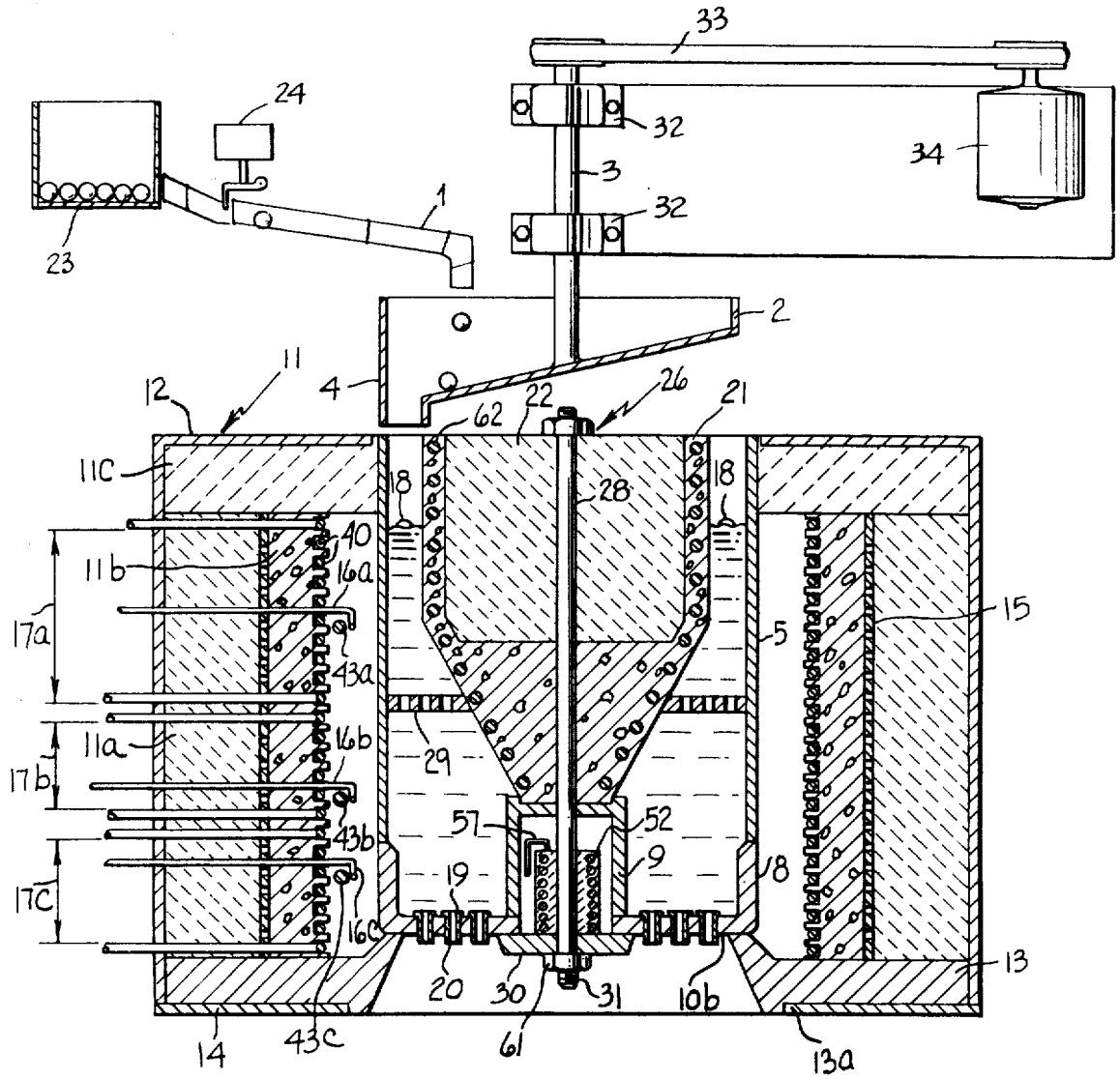
FIG. 4 is a sectional elevation view of a modified glass melting pot showing additional features of the present invention.

In this design we show the heating wire elements divided into three separate coils, 17a, 17b, and 17c, each with its own control thermocouple 16a, 16b, and 16c respectively. Coil 17a is in the melting zone where the pot wall 5 is considerably cooler because of the addition of cold marbles 18 around the circumference. Since less heat is radiated back against the wire from the cooler pot wall, it is possible in this upper region to use a much higher wall density in the wire, up to 100 to 200 watts per square inch, thus attaining the maximum possible rate of melting. In the intermediate zone covered by coil 17b, the pot wall 5 has reached its full temperature, which in the case of E glass is about 2,300°F, and, due to the high radiation back toward the wire, the current density cannot and need not be as great. In the lower coil 17c, the watt density can be raised advantageously because of the relatively large heat losses by radiation downward, especially from the pot bottom 10b. The lower side element 8 is shown in FIG. 4 as homogeneous with the pot bottom and is made by forming under pressure or by precision casting. This compares with joining the sidewall to the bottom by welding as shown in FIG. 1. Welds, however, are poor heat conductors and are also non-uniform, so by making the lower part of the sidewall homogeneous with the bottom, we both increase the rate of conduction of heat into the bottom and also make it more circumferentially uniform, which is important because of the proximity of the outer circle of precious metal tips 20 in holes 19.

In FIG. 4, we show means for continuously distributing marbles uniformly around the outer region of the pot adjacent to heated wall 5. A magnetic marble release 24, operated by an electric counter, discharges one marble at a time from supply 23 down chute 1 to continuously revolving pan 2. Pan 2 has a sloping bottom so each marble drops out through the single opening 4. The pan is attached to shaft 3 which turns in bearings 32 and is driven by variable speed motor 34 through drive 33. The feeder rotates slowly, dropping the next marble alongside the previous one, and at this slow rate of feed the next time around the previously deposited marbles are partially melted and the new marbles stick where they drop. This system insures melting the glass at a fast rate, since the marbles are close to the hot wall of the pot and also embedded in melted glass and in the relatively narrow space between the wall and a center cylindrical spacer body 26. This annular space is on the order of 1½ inches to 2 inches, or within the ready penetration of radiation through the glass.

Element 26 comprises an outer shell 21, which is preferably of high density refractory to resist erosion by the glass, but which may also be made of base metal. To provide a maximum amount of insulation the inner core 22 of element 26 is low density insulating refractory. A spiral stainless wire 62 serves to reinforce shell 21 to take care of expansion cracks. The whole assembly may be mounted on stainless rod 28, supported from central inverted metal cup 9, which in turn is attached to the bottom of the pot. Cup 9 may optionally house electric heating coil 52 controlled by thermocouple 57, and the underside is insulated by refractory disc 30 held by rod 31 and nut 61.

A screen 29 serves to prevent full marbles, partially melted, from moving down to the tips and also serves to center element 26 in the pot. Screen 29 may be of base metal but molybdenum is preferred because of its freedom from oxidation when submerged in glass.

Element 26 serves to greatly reduce the heat loss upward from the center of the pot. Also it substantially reduces the volume of glass in the pot and eliminates the slow moving colder glass which would otherwise be at the center. Walls 21 are heated by radiation from sidewall 5 and become very hot, close to the glass temperature, and this assists in the rapid melting of the marbles at 18.

There is a tendency to burn out the heating coil wire when running close to its maximum safe operating temperature, such 2,505°F for "KANTHAL A-1" wire. One reason for this failure is the uneven temperatures along the length of the spiral wire winding caused by varying contact of the wire with the refractory core 11b. First of all it is essential that the resistance wire be wound on the inner surface of core 11b in order to attain the high temperatures required in wall 5 for E glass, as any intervening refractory between the wire and the wall would reduce the wall temperature by 100° to 200°F. To position the wire stably, it has been found best to wind it in a spiral groove formed in the refractory as shown, but it must be wound loosely to allow for expansion of the wire when heated.

As a result there is variable contact around the spiral between the wire and the walls of the groove. Since the refractory is always at a lower temperature than the wire, especially when first starting up, the temperature of the wire is pulled down wherever it makes contact with the refractory. But where the wire by happenstance does not contact the refractory for a length of say 2 or 3 inches, the wire will reach a higher peak temperature, possibly 100°F or more higher than where groove contact is made. For this reason it is necessary to pre-position a selected part of the resistance wire, such as 43c for winding 17c, away from contact with refractory 11b and to locate the temperature controlling thermocouple 16c adjacent to this part of the wire. By this precaution, plus selecting the vertical position of this control wire and thermocouple at the place where the pot wall is hottest for the given zone, it is possible to obtain a year or more of life from the heating coils, even when operating close to the melting point of the resistance wire and when operating at very high watt densities. For coils 17a and 17b the protruding turns of resistance wire are 43a and 43b, and the control thermocouples are 16a and 16b.

An alternative construction of an inner core member 37 is shown in FIG. 5. In this view we show the core member with a metal jacket 38 of high temperature resisting material. This provides faster heat flow to the marble melting zone.

Referring again to FIG. 5, center core member 37 has an electric spiral resistance wire heater element 27 positioned just above it to radiate heat downward and also against its sidewall 38 and to hold the top surface of 37 at close to the temperature of the glass in the pot. When melting E glass this temperature is 2,200°F. Radiation shield 35 confines the heat to a downward direction. This heater serves to reduce the heat loss from the center of the pot upward to practically zero and may also optionally add heat to sidewall 38 of member 37 to increase the rate of melting.

Also FIG. 5 shows a series of spirally inclined baffles 36 working in conjunction with screen 29. They are preferably made of molybdenum, but may also be of base metal. Each baffle may be plain or may have small perforations. They serve to impart a rotary or mixing action to the glass, improving the blending of marbles of slight non-uniformity in composition, breaking up cords, and moving the glass circumferentially past areas of slightly different temperatures, thus improving temperature uniformity before the bottom of the pot is reached. By perforating the baffles, a small amount of glass passes vertically through the holes while a large percentage moves tangentially, thus increasing the cord breaking effectiveness.

FIG. 5 also shows a simplified method for providing the proper heat application in a vertical direction. There is a single continuous winding, but the spacing between the wire coils is varied to suit the predetermined heat distribution requirements. In the melting zone the wires 55a are spaced very close together for maximum heat emission. In the holding zone 55b they are spaced further apart and in the bottom zone 55c somewhat closer together to provide added heat for the bottom of the pot. This arrangement makes it possible to heat the whole winding with power from a single transformer and controlled by a single thermocouple and temperature controller.

FIG. 6 shows a melting pot with the lower section 58 of sufficient diameter to accommodate the number of orifices desired and with a considerably larger diameter upper section 45 to serve as the melting zone. It is undesirable to enlarge pot section 58 any more than necessary as it would increase the radiation loss from the bottom, and increase the volume of glass within the pot excessively. Since the pot melting electrical efficiency is normally about 65 percent, this means that 65 percent of the power is used in the top region to melt the glass. By making the melting zone considerably larger in diameter, it is possible to increase both the coil diameter and the gauge of the resistance wire 39 to carry very heavy currents. Also, since this coil operates in conjunction with a somewhat cooler wall 45 (because of the cooler glass), the watt density in this coil can be increased greatly even to 200 or 300 watts per square inch. Further, with a large diameter, the rotating marble feeder 48 will deposit the marbles 59 in a large enough circle such that on the next rotation the first marble will be melted even when discharging 40 to 50 pounds per hour. Since the marbles always fall on partially melted glass they do not bounce but stay where dropped. It has been found that if the cold marbles touch the outer wall they cool it down suddenly, thereby almost stopping radiation of heat for a period of time, and by dropping the marbles on melted glass this is prevented.

This pot also has the inner spacer body 47 to reduce the mass of glass near the center. The wall of spacer body 47 is about 2 inches away from wall 45 or within the range of effective radiation through the more opaque glasses, such as E glass.

The melted glass runs from the melting zone through circular screen 60 into the holding zone within lower wall 58, where heat from coil 46 has only to raise the temperature slightly, and hold it at the correct temperature and fluidity, for almost the full height of wall 58. This insures a high fluid head and permits reducing the orifice size, so more tips can be spaced in a given size circle, and also the filaments are more uniform in size because of the smaller orifices. If desired, the temperature of the glass in the upper region of section 58 may be raised to a higher temperature and then gradually cooled as it flows down in the pot to the point of discharge.

One of the most significant advantages of the present invention is that it is capable of producing continuous filaments from E glass. This glass has a relatively high melting point and drawing temperature and, heretofore, it has been impossible to successfully produce continuous filaments with it using a base metal pot. E glass is traditionally melted in precious metal elongated rectangular bushings heated by electrical resistance or in relatively small diameter platinum alloy cylindrical pots with the outer walls heated by high frequency induced currents. The pot size has been limited by the high cost of platinum as well as by its lack of strength in economical metal thicknesses. Further, the high frequency generating equipment is extremely costly, means for controlling the temperature vertically in the pot are complex and inaccurate, and experiments have shown that the temperature variation from one side of the pot bottom to the other may be as great as 100°F. Additionally, power efficiency is very low with high frequency currents on the order of 4,000 to 10,000 cycles per second, such as required for induction heating.

The method of heating devised in this invention utilizes readily available voltages of 100 to 200 volts at standard 50 or 60 cycles. Power utilization is relatively low and measurements indicate a heating efficiency of 60 to 65 percent. Most important of all is that these heating methods provide very closely controlled temperatures. This permits melting E glass, which should be held at approximately 2,200°F in the pot, and drawn at 2,150°F in the tips. Since the nickel and base metal alloys used for the sidewalls melt at about 2,550°F, the maximum allowable pot wall temperature is approximately 2,300°F without danger of pot failure. To attain this, the resistance wire must be operated at temperatures of 2,350° to 2,450°F, and these temperatures are so close to the melting points of the wire that the features of this invention are required in order to operate continuously for long periods of time. A pot wall temperature of 2,300°F is sufficient to melt the E glass, provided it is held relatively close to the pot wall in the melting zone. For instance E glass has such high degree of opacity to radiation that it is difficult to penetrate radiant heat into the glass through distances of over 1½ to 2 inches of melted glass. Due to the relatively low heat conductivity of all glasses, practically all heat transfer must be by radiation.

E glass, which is a low alkali, lime alumina borosilicate glass, has been found to be ideally suited to the production of continuous filaments. It has a good "working range" or drawing temperature differential between too cool, where the filament breaks in tension, or too hot, where the filament parts through surface tension. Even so, it is essential to control the temperature closely, and it has been found possible to hold the tip temperature measured around the circumference of the pot within plus or minus 5°F using the pot design described herewith. This is a significant improvement over previously used high frequency heated round pots and is more uniform than resistance heated elongated rectangular bushings.

Another important reason for the center spacer body 28 of FIG. 4 when melting E glass is because the liquidus temperature of E glass is 2,00° to 2,050°F, which is very close to the desired temperature of the glass just above the orifices of 2,200°F. If a glass is held at its liquidus temperature for a protracted period of time it devitrifies, and the devitrified glass crystalline structure has a much higher melting point. If it were not for spacer element 26 of FIG. 4, the glass near the center of the pot would pass through the liquidus temperature too slowly and would tend to devitrify.

It has been found that the improved electrically heated bushing requires about 8 kilowatts of power to produce 35 pounds per hour of melted glass and with an efficiency of about 60 percent. For this example then, 4,8 kilowatts are actually required to melt the glass, and the remainder of the power is to overcome heat losses. The form of bushing design shown in FIG. 6 with the enlarged melting zone 45 permits easy generation of this much heat in the melting zone, in fact, with an 8-inch-diameter lower section 58 and a 12-inch-diameter upper section 45, 10 kilowatts can be easily radiated in the melting zone using a watt density of not over 40.

One of the significant advantages of the present invention is that it is also capable of producing filaments from relatively soft glasses, such as lime-borosilicate glass. The softer glasses, which have a drawing temperature range of about 1,650° to 1,850°F, are considerably less expensive, but they have not been widely used because filaments drawn from the softer glasses are more easily broken in tension during winding. If only one filament breaks, a bead forms on the tip of the bushing from which that particular filament was being drawn, and the hot bead then drops into the converging cone of other fibers drawn from the same pot, thereby breaking out the entire operation, with consequent losses of production and excessive operator attention. One of the specific reasons for the difficulty of working with the softer glasses is the relatively sharp viscosity-temperature characteristic of such glasses. More particularly, a given temperature change results in a considerably greater change in viscosity in the softer glasses than in the E glass, for example, so that it is more critical to maintain a uniform temperature in the melting pot when the softer glasses are utilized.

Whereas some of the features of my invention apply specifically to pots or bushings for melting marbles or glass cullet, the main construction of the base metal pot with the external electric heating coil and the internal bottom heating coil, apply equally well to bushings positioned under a direct melt forehearth and supplied with melted glass at closely controlled temperatures. The advantages of this invention for this application are low power usage, use of low cost materials in the bushing construction permitting larger sizes with a greater number of orifices, and more accurate glass temperature control for greater bushing efficiencies with fewer breaks in drawing. While the advantageous results of the instant invention may be obtained with glass melting pots of any geometrical configuration, the preferred embodiment, as described above, has been comprised of a cylindrical configuration. Also the configuration shape of this pot or bushing has a definite advantage over the elongated rectangular bushing in that bead-outs or filament breaks when running continuous filament products do not always result in breaking out all of the other filaments. For instance, beads from the outer circle of filaments fall free and do not break out the other filaments.

Certain features of this invention are equally useful and advantageous when used with other systems of heat application or in combination with other methods and the spirally wound electrical resistance wire heater. Such applications apply when accuracy or temperature at the tips is less importance than other considerations.

For instance, the electric heating coil in the center of the pot can be used in conjunction with a gas fired outer wall heater in which gas flames are impinged tangentially in a cylindrical chamber surrounding the outer wall of the pot. The center heater can also be used where the outer wall is inductively heated by high frequency currents. For any specific glass composition there is an ideal drawing temperature in the tip dictated by the viscosity characteristics of the glass, the rate of cooling of the glass cone leaving the tip, etc. Without the center heater, the diameter of the orifices in successive circles toward the center must be made larger to feed glass at the same desired rate per tip so all filaments are the same size after cooling. Therefore, the glass temperature as it passes through the tip is only ideally correct for one circle of holes. For instance if correct for the outer circle, then for the inner circle the temperature will be too low. This condition is largely corrected by the inner heating coil.

Further, the upper central spacer body can be used with the other methods of outer wall heating. It corrects the main disadvantage of previous circular pots, namely the glass in the center is too hard to reach from the outer periphery heat source, and is therefore too cold.

Additionally, the enlarged diameter upper melting zone can be used with other methods. It provides the basic advantage of larger wall surface area for the melting zone where most of the heat transfer must take place. Gas heat may be used for the enlarged melting zone in localities where the lower fuel cost is an economic factor offsetting the greater uniformity of electric heat. In such a pot the lower holding zone, with its lower power requirements would be heated by spiral electric resistance wire radiation for best results.

Further, the outer rotary marble feeder, the mixing effect from stationary baffles, and the homogeneous bottom and sidewall construction apply equally well to pot assemblies having other methods of outer pot wall heating, but with the one reservation that uniformity of tip temperature will not be as great. However, for certain continuous strand products, such as for example, chopped strand for plastic reinforcemnt, and for flame attenuated insulation products, the accuracy may be satisfactory.

What I claim is:

1. A glass melting pot for containing a body of molten glass to be drawn into continuous filaments, said melting pot comprising upstanding sidewalls made of nickel or an alloy selected from the group consisting of nickel base alloys and stainless steel, said alloy having a melting point substantially higher than that of the glass to be melted therein, a bottom wall having a multiplicity of apertures formed therein to permit the drawing of glass filaments from the molten glass contained in said melting pot, a refractory shell disposed around the outside of the sidewalls of said melting pot and spaced from the outer surface of the said melting pot so as to form an annular air space between the refractory shell and the outside surface of said sidewalls, a spiral electric heating coil supported on the inner surface of the refractory shell and spaced from the sidewalls of said melting pot for heating said pot by radiant heating, and a secondary electric heating coil disposed within the central portion of said melting pot at the bottom thereof.

2. A glass melting pot as defined in claim 1 wherein said secondary electric heating coil is wound around a refractory cone extending upwardly from said bottom wall within said melting point.

3. A glass melting pot as defined in claim 1 wherein a conical metal shell is disposed around said secondary electric heating coil within the lower central portion of said melting pot.

4. A generally cylindrical glass melting pot for containing a body of molten glass to be drawn into continuous filaments, said melting pot comprising upstanding sidewalls made of nickel or an alloy selected from the group consisting of nickel base alloys and stainless steel, said alloy having a melting point substantially higher than that of the glass to be melted therein, a bottom wall having a multiplicity of apertures formed therein to permit the drawing of glass filaments from the molten glass contained in said melting pot, and an electric heating coil disposed within the central portion of said melting pot and forming a portion of said bottom wall.

5. A glass melting pot as defined in claim 4 and further comprising a circular spacer body in the upper center of the pot, said spacer body extending down towards the bottom of said pot.

6. A glass melting pot as defined in claim 4 and further comprising means for applying heat through the outer vertical sidewalls thereof.

7. A generally cylindrical glass pot for containing a body of molten glass to be drawn into continuous filaments, said pot comprising upstanding sidewalls made of nickel or an alloy selected from the group consisting of nickel base alloys and stainless steel, said alloy having a melting point substantially higher than that of the glass to be melted therein, a bottom wall having a multiplicity of apertures formed therein to permit the drawing of glass filaments from the molten glass contained in said pot, means for applying heat through the outer vertical sidewalls thereof, a circular spacer body in the upper center of the pot, said spacer body extending down toward the bottom of said pot, a plurality of spirally inclined baffles positioned around and adjacent the outer walls of said pot to impart a rotary motion to the glass, said baffles being inclined with respect to the outer walls of the pot.

8. A glass melting pot for containing a body of molten glass to be drawn into continuous filaments, said pot comprising upstanding sidewalls made of nickel or an alloy selected from the group consisting of nickel base alloys and stainless steel, said alloy having a melting point substantially higher than that of the glass to be melted therein, a bottom wall having a plurality of apertures formed therein to permit the drawing of glass filaments from the molten glass contained in said pot, means for applying heat to melt glass marbles deposited in said pot, and to maintain said molten glass liquid, and means for depositing said glass marbles uniformly and continuously around and contiguous to the inner perimeter of the outer sidewalls of said pot.

9. A glass melting pot for containing a body of molten glass to be drawn into continuous filaments, said pot comprising upstanding sidewalls made of nickel or an alloy selected from the group consisting of nickel base alloys and stainless steel, said alloy having a melting point substantially higher than that of the glass to be melted therein, a bottom wall having a plurality of apertures formed therein to permit the drawing of glass filaments from the molten glass contained in said pot, means for applying heat to melt glass marbles deposited in said pot, and to maintain said molten glass liquid, and means for depositing said glass marbles uniformly and continuously around and contiguous to the inner perimeter of the outer sidewalls of said pot comprising a rotating marble feeder having an off center opening through which said marbles pass.

10. A glass melting pot as defined in claim 8 and further comprising an upper melting zone of larger diameter than the main body of the pot.

11. A glass melting pot as defined in claim 10 wherein said upstanding sidewalls are cylindrical.

12. A glass melting pot as defined in claim 11 and further comprising a circular spacer body in the upper center of the pot, said spacer body extending down toward the bottom of said pot.

* * * * *